(12) United States Patent
Yoshida et al.

(10) Patent No.: US 8,821,326 B2
(45) Date of Patent: Sep. 2, 2014

(54) RATCHET-TYPE TENSIONER

(75) Inventors: Osamu Yoshida, Osaka (JP); Yuji Kurematsu, Osaka (JP); Munehiro Maeda, Osaka (JP); Akira Ishii, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 316 days.

(21) Appl. No.: 13/474,792

(22) Filed: May 18, 2012

(65) Prior Publication Data
US 2013/0310206 A1   Nov. 21, 2013

(51) Int. Cl.
*F16H 7/08* (2006.01)

(52) U.S. Cl.
USPC .......................................... 474/110

(58) Field of Classification Search
CPC .......... F16H 7/0848; F16H 2007/0806; F16H 2007/0812; F16H 2007/0853; F16H 2007/0859
USPC .......... 474/101, 109, 110, 111, 112, 135, 140
See application file for complete search history.

(56) References Cited

U.S. PATENT DOCUMENTS

| | | | |
|---|---|---|---|
| 5,055,089 A | 10/1991 | Ojima | |
| 6,120,402 A * | 9/2000 | Preston et al. | 474/109 |
| 2003/0195070 A1* | 10/2003 | Beardmore | 474/110 |
| 2005/0239589 A1* | 10/2005 | Seungpyo et al. | 474/110 |
| 2012/0122619 A1* | 5/2012 | Yoshida et al. | 474/110 |
| 2012/0196709 A1 | 8/2012 | Kurematsu | |
| 2012/0225743 A1 | 9/2012 | Ishii | |
| 2012/0244975 A1 | 9/2012 | Kurematsu | |
| 2012/0309570 A1* | 12/2012 | Kurematsu et al. | 474/110 |

FOREIGN PATENT DOCUMENTS

| | | |
|---|---|---|
| EP | 131868 | 6/2003 |
| JP | 2559664 | 9/1997 |

OTHER PUBLICATIONS

U.S. Appl. No. 13/477,345 for Ratchet-Type Tensioner.
British Search Report dated Jul. 23, 2012 issued in British counterpart Patent Application No. GB1206852.3.

\* cited by examiner

*Primary Examiner* — William E Dondero
*Assistant Examiner* — Robert T Reese
(74) *Attorney, Agent, or Firm* — Howson & Howson LLP

(57) ABSTRACT

In a ratchet-type tensioner having a plunger with rack teeth formed thereon and a piston with ratchet teeth that engage the rack teeth, the ratchet teeth can be disengaged from the rack teeth by insertion of a tool through a tool insertion hole in the tensioner housing and exerting a prying action on the toothed end of the piston to move the piston away from the plunger. Alternatively if an oblique camming surface is formed on the toothed end of the piston, the ratchet teeth can be disengaged from the rack teeth by pushing the tool inward against the oblique camming surface. The piston and the hole in which it slides are shaped to prevent rotation of the piston. The ratchet teeth on the piston and the rack teeth on the plunger can be oblique to allow setback of the plunger when excessive force is exerted on the plunger.

10 Claims, 16 Drawing Sheets

$f1 = F1 \times \sin\alpha \times \cos\alpha$ $$f1 = F1 \times \sin\theta \times \cos\theta \times \mu$$

$f2 = F2 \times \sin\theta \times \cos\theta \times \mu$ $f2 = F2 \times \sin\theta \times \cos\theta \times \mu$ $$f1 = F1 \times \sin\theta \times \cos\theta \times \mu$$

RATCHET-TYPE TENSIONER

FIELD OF THE INVENTION

This invention relates to a ratchet-type tensioner for applying tension to an endless, flexible, transmission medium such as a timing chain for driving one or more camshafts in an internal combustion engine.

BACKGROUND OF THE INVENTION

A typical ratchet-type tensioner applies tension to a timing chain by exerting force on the chain by means of a plunger which is movable along an advancing and setback direction, in a plunger accommodating hole in the tensioner housing. The plunger is biased in the advancing direction by a spring and external hydraulic pressure provided by oil in a chamber formed by the tensioner housing and the plunger.

A typical prior art ratchet-type tensioner is disclosed in Japanese Utility Model No. 2559664, and shown in FIG. 16. In the tensioner 500, a plunger 514 is slidable in a plunger-accommodating hole in a housing 512, and protrudes from the housing, being biased in the advancing direction by a spring 518 and by oil pressure within a chamber 516 formed by the plunger and the housing.

A piston 526 slides in the housing 512 in a direction orthogonal to the direction in which the plunger 514 slides. An oil sub-chamber 520 is formed by the piston 526 and the housing 512, and an oil passage 544 supplies oil under pressure to the oil sub-chamber 520, urging the piston away from the plunger 514. A spring 534 biases the piston 526 toward the plunger, opposing the force exerted by the oil in the sub-chamber 520. Spring 534 is located within an air chamber 528 on the side of piston 526 opposite from the sub-chamber 520. An air hole 532 in communication with the air chamber 528 is closable by a rod 524, to which the piston 526 is attached, when the piston 526 is moved away from the plunger against the biasing force exerted by spring 534 by hydraulic pressure in sub-chamber 520 and the piston 526 moves against a biasing force of the second spring 534.

A rack of teeth 538 is provided on the plunger 514, and a plurality of ratchet teeth 536, capable of engaging the rack teeth 538, is provided at the end of rod 524 opposite form the end that is arranged to close off air hole 532. Surfaces of teeth 536 and 538 for blocking retraction of the plunger are formed at a right angle to the direction in which the plunger 514 moves.

The prior art tensioner requires precise assembly of the cap 530, which is sealed by press-fitting after the rod 524 has been installed within the air chamber 528. Thus, the cap 530 cannot be readily removed, preventing ready disengagement of the rack teeth 538 and ratchet teeth 536 for maintenance of the tensioner 500 and timing chain (not shown).

Further, because the prior art tensioner 500 comprises a plunger 514 and piston 526, engagement of the rack teeth 539 and ratchet teeth 536 causes a twist in the rod 524, which, as the plunger 514 vibrates while the engine is driving, can cause chipping of the teeth. In addition, the twist in the rod 524 can lead to faulty operation of the ratchet mechanism, and to erroneous assembly during manufacture and maintenance of the tensioner.

Because the tooth surfaces in the setback direction are perpendicular to the advance/setback direction of the plunger 514, setback of the tensioner is prevented even when it may be desirable, i.e., when tension of the chain becomes excessive due to temperature change and other causes. Thus, the prior art tensioner 500 experiences excessive tension, wear, noise and eventual seizing.

To alleviate the problems of excessive tension, wear, noise, etc., a predetermined backlash is provided in the ratchet mechanism, corresponding to a presumed maximum distance of the movement of the plunger 514 in the setback direction caused by the excessive tension. However, the larger the allowed backlash distance, the larger the "flapping noise" generated on starting the engine.

Prior steps to remedy these problems have been the addition of an orifice mechanism and an oil-reserve mechanism or replacement of the spring 518 with a higher-load spring. However, this increases the number of parts, the cost of production, and the size of the tensioner itself.

SUMMARY OF THE INVENTION

Accordingly, the invention aims at solving the problems by providing a ratchet-type tensioner that allows ready release of engagement of the ratchet mechanism with the plunger for maintenance; allows for secure and stable operation of the ratchet mechanism; reduces flapping noise on starting an engine which has sat for a while; and prevents seizure of the plunger by allowing setback when excessive tension occurs.

In order to resolve the aforementioned problems, the invention provides, in a first aspect, a ratchet-type tensioner, which includes a housing, a plunger, a high-pressure oil chamber formed by the plunger and the housing, and a ratchet mechanism. The plunger is supported by the housing and moves in opposite advancing and setback directions in a plunger-receiving hole. The plunger has rack teeth provided thereon, and is arranged to advance along the advancing direction to apply tension to a traveling transmission medium engaged with rotating members. The ratchet mechanism is capable of restricting the plunger from setting back due to a reaction force acting in a setback direction from the transmission medium. The ratchet mechanism includes a piston-receiving hole within the housing, and has a front end adjacent the plunger-receiving hole and a rear end remote from the plunger-receiving hole. The piston receiving hole also has an outer circumferential surface. The ratchet mechanism also comprises a piston, which is slidable in the piston-receiving hole and movable in a sliding direction transverse to the advancing and setback directions. The piston has ratchet teeth provided thereon, which are engageable with the rack teeth of the plunger. A piston-biasing spring is provided for biasing the piston in an engaging direction along the sliding direction so that the ratchet teeth engage with the rack teeth. The ratchet mechanism further includes a plug fitted in the rear end of the piston-receiving hole. The piston-biasing spring bears against the plug.

The ratchet mechanism also includes a ratchet releasing mechanism for releasing engagement of the ratchet teeth with the rack teeth. The ratchet releasing mechanism includes a tool engaging portion provided at the front end of the piston to abut and engage with an end of a tool and a tool inserting hole provided in the housing. The tool can be inserted through the hole and engaged with the tool engaging portion, thereby pushing the piston away from the plunger so that the ratchet teeth disengage the rack teeth. The ratchet releasing mechanism allows for ease of maintenance of the tensioner, for positioning and replacing parts, and loosening the timing chain when desirable.

In one aspect of the invention, the tool engaging portion of the piston includes a stepped abutment surface formed at the front end of the piston, between the ratchet teeth and the outer circumferential surface of the piston. The tool inserting hole is positioned to allow the piston to be pushed away from the plunger by a prying action exerted against the stepped abutment surface by the tool. Therefore, it is possible to release the engagement of the ratchet teeth and the rack teeth easily.

In another aspect, the tool engaging portion of the piston includes a tapered abutment surface formed on the piston adjacent the ratchet teeth on the piston. The pin inserting hole is positioned to allow the piston to be pushed away from the plunger by a camming action exerted against the tapered abutment surface by the tool. Therefore, it is possible to release the engagement of the ratchet teeth and the rack teeth readily.

Preferably, the ratchet mechanism restricts the plunger from setting back by engaging the ratchet teeth with the rack teeth when the reaction force is a first reaction force generated when the tension in the traveling transmission medium is less than a predetermined excessive tension, but allows the plunger to set back by sliding of the piston in a disengaging direction to disengage the ratchet teeth from the rack teeth when the reaction force is a second, and greater, reaction force generated when the tension in the traveling transmission medium is at least as great as the predetermined excessive tension. The ratchet biasing force is greater than a first component force in the sliding direction, generated from the first reaction force, but smaller than a second component force in the sliding direction, generated from the second reaction force. Accordingly, it is possible to reduce the noise of flapping the transmission medium by restricting movement, thereby blocking setback displacement when the reaction force is at the first level. In addition, no special high load-accommodating plunger-biasing spring is required, the tensioner itself can be downsized, and the number of parts and its manufacturing cost can be reduced.

Because the biasing force of the plunger biasing spring is smaller than the component force in the sliding direction of the plunger when the tension in the transmission medium becomes excessive, the second force component acting on the teeth of the piston when the tension is excessive enables the ratchet teeth to disengage the rack teeth on the plunger. The plunger is then set back until the biasing force of the ratchet biasing means becomes greater than the second force component. Consequently it is possible to prevent seizing of the plunger by allowing setback displacement without causing backlash due to excessive tension in the traveling transmission medium. It is also possible to achieve reliable prevention of seizing of the plunger by adjusting the biasing force exerted by the ratchet-biasing means, thereby controlling the timing of tooth disengagement when the transmission medium comes under excessive tension.

The rack teeth are preferably concave and convex teeth formed by stop surfaces facing in the setback direction and sliding surfaces facing in the advance direction. The sliding surfaces are inclined relative to the sliding direction and face in a disengaging direction opposite from the engaging direction. The ratchet teeth of the piston are preferably concave and convex teeth formed by stop counterface surfaces inclined toward the advance direction when proceeding in the disengaging direction, and sliding counterface surfaces inclined toward the setback direction when proceeding in the disengaging direction. With this tooth structure, it is possible to prevent the jumping of rack teeth that occurs in the case of rack teeth having stop surfaces that are not inclined, even when retardation of the movement of the piston occurs due to its inertia.

When the second reaction force, i.e., a force that sets back the plunger when excessive tension is generated in the transmission medium, acts on the stop surfaces of the ratchet teeth, a component force acts on the stop counterface surfaces of the ratchet teeth, causing the piston to slide in a direction away from the plunger so that its teeth disengage the rack teeth of the plunger. Then, the rack teeth of the plunger slide over the counterface surfaces, clearing the ratchet teeth with which they are engaged, allowing the plunger to set back by a distance corresponding to one tooth. Setback displacement takes place smoothly without restriction on the movement of the plunger in the setback direction. Wear and damage, such as chipping of the rack teeth and ratchet teeth, which would otherwise occur as a result of excessive tension, are prevented. Excessive impact on the ratchet-biasing spring is also avoided. The ratchet mechanism therefore exhibits excellent durability.

The inclination angle of the stop surface is preferably smaller than the inclination angle of the sliding surface, the inclination angles being measured relative to the sliding direction of the piston. As a result, it is possible to block the plunger from setting back as a result of the first, lower level, reaction force, and thereby reduce noise caused by the setting back of the plunger.

Preferably, the ratchet mechanism comprises a means for preventing rotation of the piston in the circumferential direction of the piston receiving hole when the ratchet teeth and rack teeth are engaged. The rotation preventing means stops the outer circumferential surface of the piston from turning against the inner circumferential surface of the piston-receiving hole regardless whether the rack teeth engage the ratchet teeth, even when the plunger vibrates as the engine is driven. Accordingly, operation of the piston is secure and stable, and engagement of the ratchet teeth with the rack teeth is precise across their entire width because twist in the ratchet mechanism is avoided.

In one embodiment, the means for preventing movement is provided by a convex strip on the outer circumferential surface of the piston and a concave groove in the piston-receiving hole in the housing. The groove extends along the sliding direction of the piston and receives the convex strip. Accordingly, it is possible to slide the piston while completely stopping the outer circumferential surface thereof from turning against the inner circumferential surface of the piston-accommodating hole, allowing the piston to operate smoothly. Production of the piston is simplified as compared to an engagement matching mechanism utilizing a convex strip in the ratchet-accommodating hole.

Preferably, the length of the piston is greater than the outer diameter thereof. Accordingly, inclination is suppressed, and biasing wear is prevented, even when excessive tension is applied to the piston.

In one aspect, the piston-biasing spring is inserted within a spring-accommodating hole formed in the piston along the sliding direction. As compared to a piston in which the ratchet biasing spring is fitted around the outer circumferential surface of the piston, the size of the spring can be reduced and assembly is simplified.

DETAILED DESCRIPTION OF THE INVENTION

Figure 1:
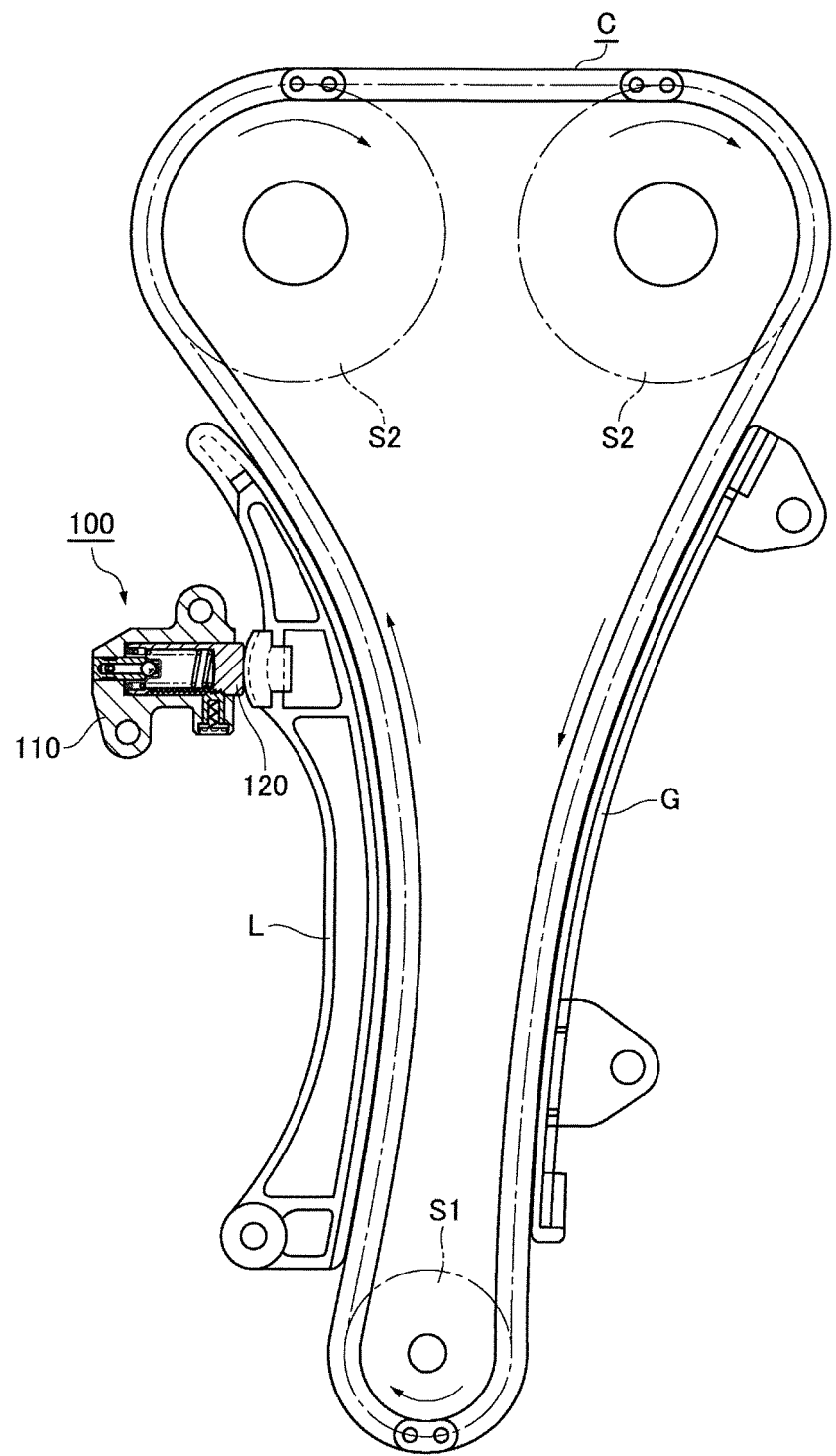
FIG. 1 is a schematic elevational view of an engine timing transmission incorporating a ratchet-type tensioner in accordance with the invention.

As shown in FIG. 1, the ratchet-type tensioner 100 of the invention is attached to an engine (not shown) on a slack side of a timing chain C which is engaged with a sprocket S1 rotated by a crankshaft and a pair of driven sprockets S2 fixed to camshafts.

The ratchet-type tensioner 100 has a housing 110 and a plunger 120 that slidably projects out of a front surface of the housing 110. The plunger 120 applies tension to the slack side of the timing chain C, i.e., the side that travels from the crankshaft sprocket S1 toward one of the camshaft sprockets S2. The plunger applies tension through a movable lever L on which the chain slides, and which is pivoted on the engine block, and presses the plunger 120 at a location remote from the lever's pivot axis.

The basic configuration of the housing 110 of the tensioner 100 may be one that supplies oil under pressure from an oil pump (not shown) to the oil supply passage 111 formed within the housing 110, or one that has a concave oil reservoir formed on a back part of the housing 110 to contain the oil supplied from the oil pump before introducing it into the oil supply passage 111.

A stationary guide G for guiding travel of the timing chain C is mounted to the engine block on the tension side of the timing chain C, i.e., the side of the chain that travels from the other of the camshaft sprockets 52 toward the crankshaft sprocket S1. Arrows indicate the direction of travel of the chain C and the direction of rotation of the sprockets.

Figure 2A:
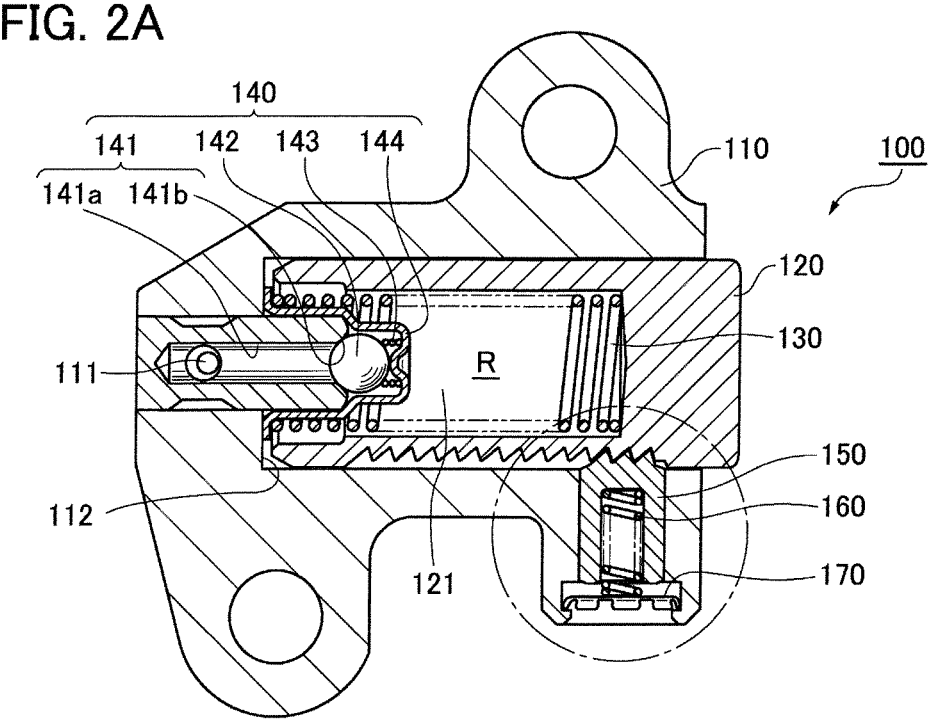
FIG. 2A is a longitudinal cross-section of a ratchet-type tensioner according to the invention.
Figure 2B:
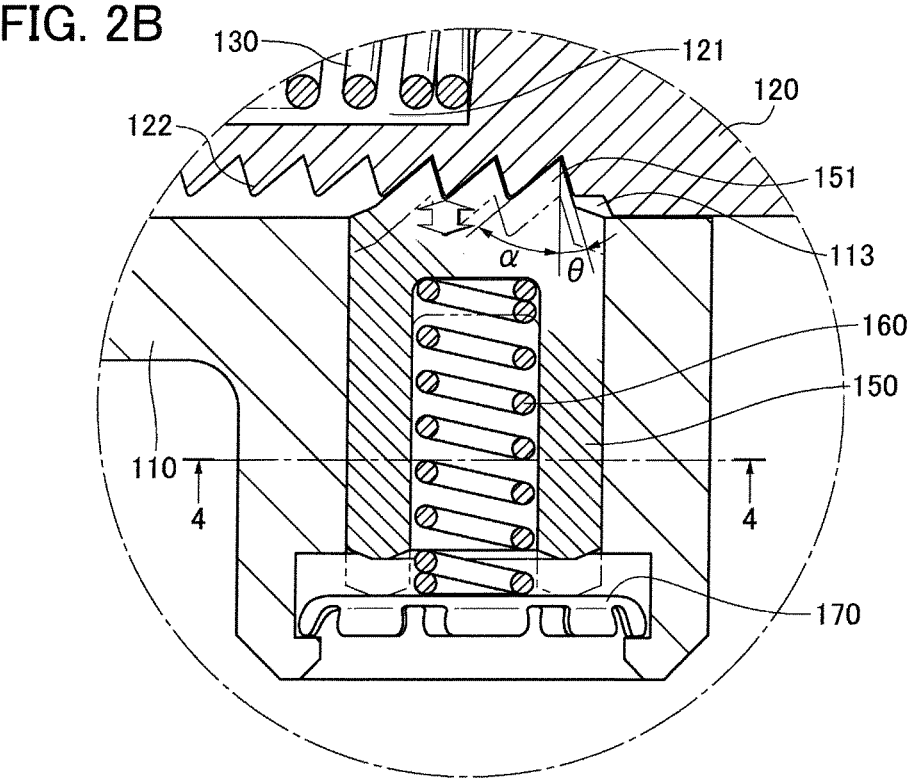
FIG. 2B is an enlarged view of a part of the ratchet-type tensioner surrounded by a broken line in FIG. 2A.

As shown in FIG. 2, the ratchet-type tensioner 100 has a housing 110 having an oil supply path 111 for introducing oil supplied under pressure from the engine, a plunger-accommodating hole 112 formed in the housing 110 to accommodate the plunger 120, which is hollow, having an interior space 121 open at the end opposite from the protruding end. The plunger 120 is reciprocable in the advance/setback direction and protrudes out of the plunger-accommodating hole 112 to apply tension to the chain as shown in FIG. 1. A high-pressure oil chamber R is formed between the plunger-accommodating hole 112 of the housing 110 and a hollow interior space 121 of the plunger 120. A plunger-biasing spring 130 is disposed within the high-pressure oil chamber R and biases the plunger 120 in the advancing direction. A check valve 140 in the plunger-accommodating hole 112 blocks the oil from flowing backward from the high-pressure oil chamber R to the oil supply path 111.

A piston-receiving hole 113 is formed in the housing 110, and a piston 150 is inserted into the piston-receiving hole 113 and slides in a direction transverse the advance/setback direction of the plunger 120. A piston-biasing spring 160 is provided for biasing the piston 150 toward the plunger 120 so that ratchet teeth 151 provided on the plunger-side edge of the piston 150 engage with rack teeth 122 engraved on a side of the plunger 120. A spring stopping plug 170 is fitted in the rear end area of the piston-receiving hole 113 and the piston-biasing spring 160 bears against the plug 170.

The check valve 140 may be any known type of check valve. The check valve may be in any conventional location, including a location within the setback direction end of the plunger-accommodating hole 112, inside the high pressure oil chamber R in the interior of the plunger 120, or in the oil path outside of the housing 110. The check valve allows oil to be introduced through the oil supply path 111 to the high-pressure oil chamber R, and blocks the oil from flowing in the reverse direction from the high-pressure oil chamber R to the oil supply path 111.

In the embodiment shown in FIG. 2A, the check valve unit 140 has a ball seat 141 having an oil passage 141a communicating with the oil supply path 111 in the housing 110, a check ball 142 seated on a valve seat 141b of the ball seat 141, a ball-biasing spring 143 for biasing the check ball 142 against the ball seat 141, and a bell-shaped retainer 144 for supporting the ball-biasing spring 143 and restricting movement of the check ball 142.

Figure 4:
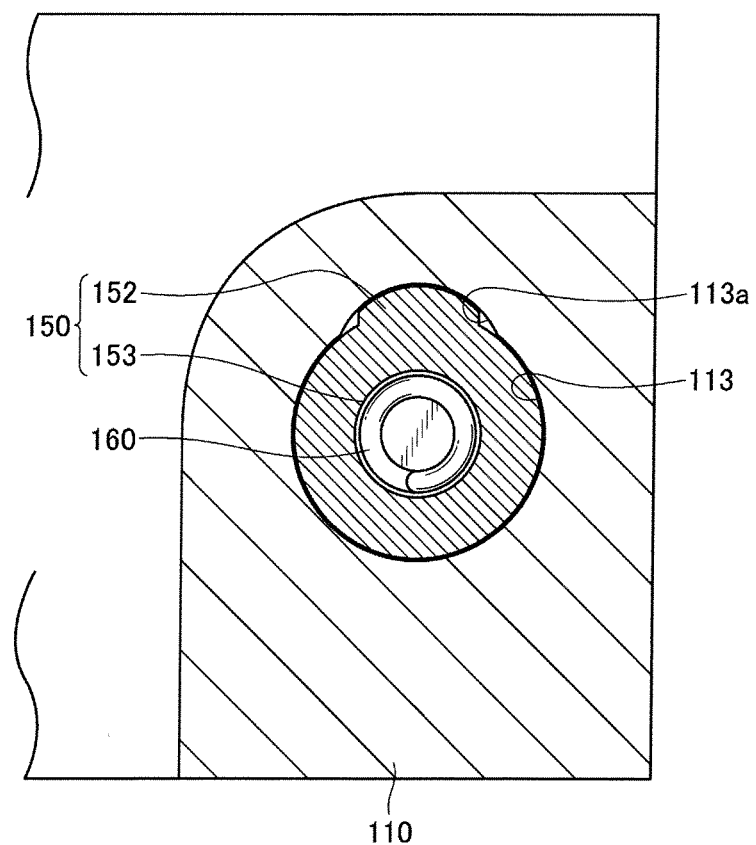
FIG. 4 is a cross-section view taken on plane 4-4 in FIG. 2B.

The ratchet-type tensioner 100 of the invention is provided with a means for preventing rotation of the piston in the circumferential direction of the piston receiving hole 113 when the ratchet teeth 151 and rack teeth 122 are engaged. In the embodiment shown in FIG. 4, the means for preventing rotation of the piston 150 is provided by a convex strip 152 on the outer circumferential surface of the piston 150 and a concave groove 113a in the piston-receiving hole 113 in the housing 110. The groove 113a extends along the sliding direction of the piston and receives the convex strip 152. This allows the piston to protrude out of the piston-receiving hole, while stopping the outer circumferential surface of the piston 150 from turning against the inner circumferential surface of the ratchet-accommodating hole 113. It also allows the ratchet teeth 151 to engage with the rack teeth 122 precisely across the entire width, even when the plunger 120 vibrates when the engine is driven.

Figure 13:
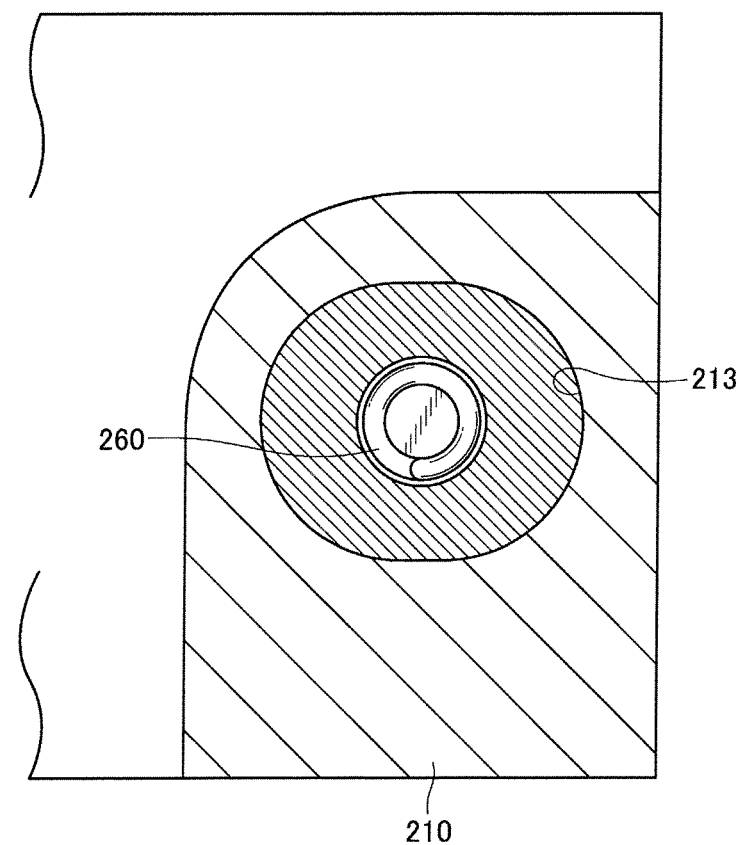
FIG. 13 is a cross-section view taken on plane 13-13 in FIG. 12B.

In another embodiment, as shown in FIG. 13, the means for preventing rotation of the piston is provided by a piston having an oval cross=section and a ratchet-accommodating hole 213 formed in the housing also having an oval cross-section, substantially in the same shape as the piston. This prevents the outer circumferential surface of the piston from turning with respect to the inner circumferential surface of the piston-accommodating hole 213 that extends in a direction orthogonal to the direction in which the plunger 220 slides. This arrangement permits precise engagement of the ratchet teeth 251 with the rack teeth 222 across the entire width of the teeth, even when the plunger 220 is caused to vibrate by the operation of the engine. This arrangement requires no precise mechanical work, and reduces the burden of production.

The engaging direction is the direction of movement of the piston 150 when the piston approaches the plunger 120, and the disengaging direction is the direction opposite the engaging direction, i.e., the direction in which the piston 150 recedes from the plunger 120.

Any means for preventing rotation of the piston 150 in the circumferential direction of the piston receiving hole 113 can be used, provided the means is constructed so as to stop the outer circumferential surface of the piston 150 from turning against the inner circumferential surface of the piston-receiving hole 113, but allows the piston 150 to slide easily in the sliding direction and to protrude from the piston-receiving hole 113 to allow engagement of the rack teeth 122 with the ratchet teeth 151. Means for preventing rotation of the piston 150 in the circumferential direction of the piston receiving hole 113 include a convex pin protruding from a point in the outer circumferential surface of the piston 150, in combination with a matching concave groove extending along the inner circumferential surface of the piston-receiving hole 113. Additional means for preventing rotation of the piston 150 in the circumferential direction of the piston receiving hole 113 include a convex pin protruding from a point in the inner circumferential surface of the piston-receiving hole 113, in combination with a matching concave groove extending along the outer circumferential surface of the piston 150. Still additional means for preventing rotation of the piston are provided by a concave groove formed on the outer circumferential surface of the piston and a convex strip on the inner circumferential surface of the piston-receiving hole 113. The groove extends along the sliding direction of the piston 150 and receives the convex strip on the piston-receiving hole 113.

By the term "inner circumferential surface", it is meant the inner edge of the item thereafter named, e.g., the plunger receiving hole. However, the term is not limited to edges which are circular in shape. Semi-circular, oblong, oval, and irregularly shaped holes, without limitation, are also included in the definition of this term.

By the term "outer circumferential surface", it is meant the outer edge of the item thereafter described, e.g., the piston. However, the term is not limited to edges which are circular in shape. Semi-circular, oblong, oval, and irregularly shaped holes, without limitation, are also included in the definition of this term.

Figure 5:
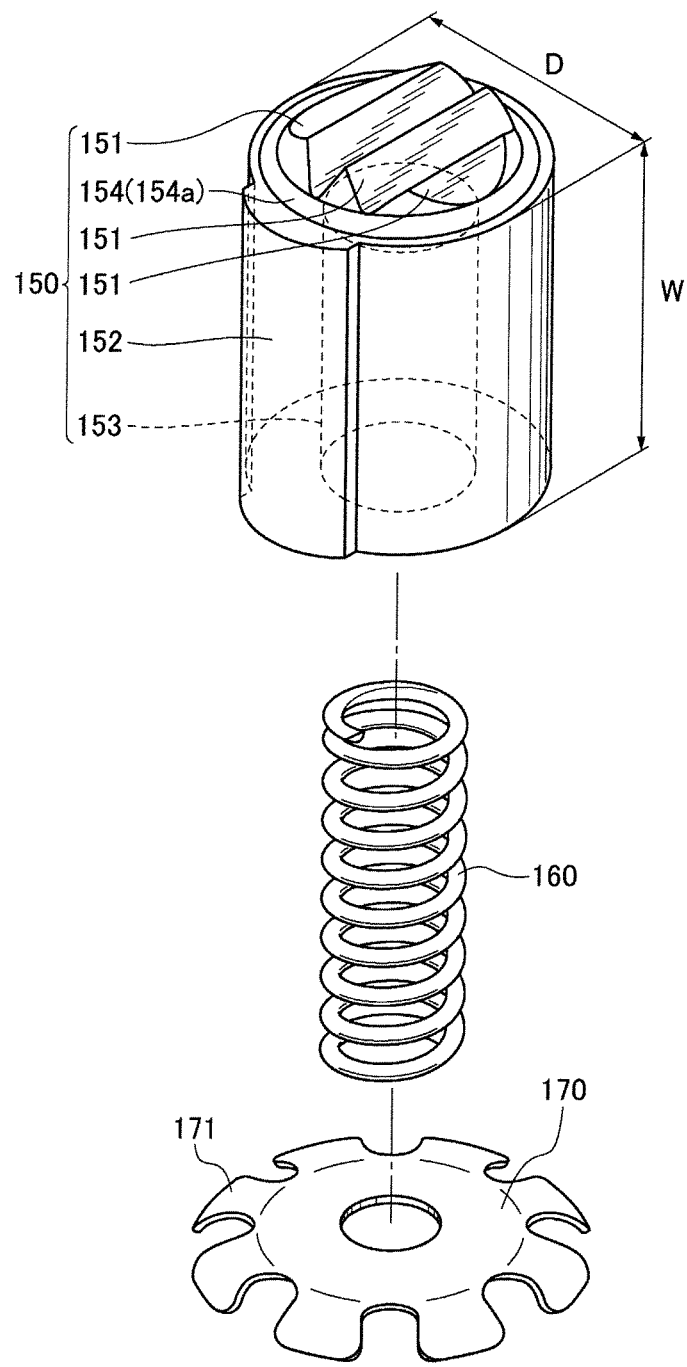
FIG. 5 is an exploded view of a piston, a piston biasing spring and a spring stopping plug.

As shown in FIG. 5, the length W of the piston 150 is greater than an outer diameter D thereof. This arrangement permits the ratchet mechanism comprising the plunger 120 and the piston 150 to operate more smoothly by suppressing inclination and preventing wear of the piston-receiving hole 113 caused by bias of the piston 150, that would otherwise be caused when an overload is applied to the piston 150.

Figure 3:
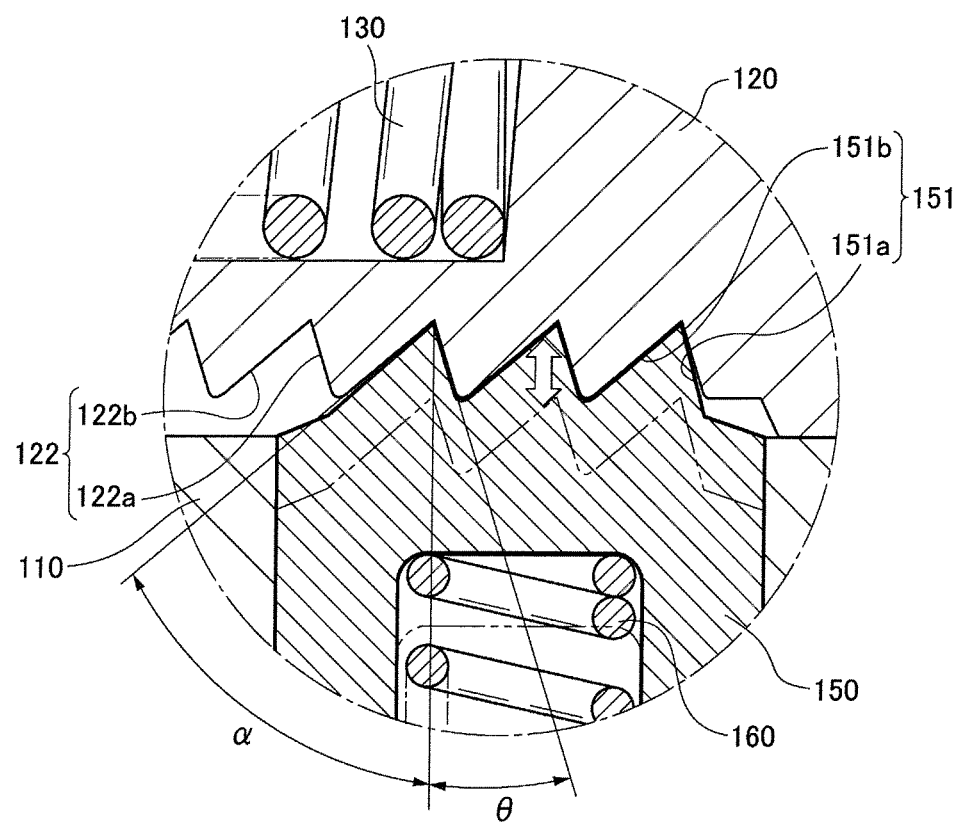
FIG. 3 is an enlarged view of rack teeth and ratchet teeth as shown in FIG. 2B.

In one embodiment, as shown in FIGS. 3 and 5, to disperse the engagement load evenly, the plunger 150 is provided with three ratchet teeth 122 for engagement with the rack teeth 122 engraved on the side surface of the plunger 120. The three ratchet teeth 151 are disposed at intervals equal to the distance between the rack teeth 122. In addition, the pitch and tooth height of the rack teeth 122 are equal to the pitch and height of the ratchet teeth 151.

Figure 14:
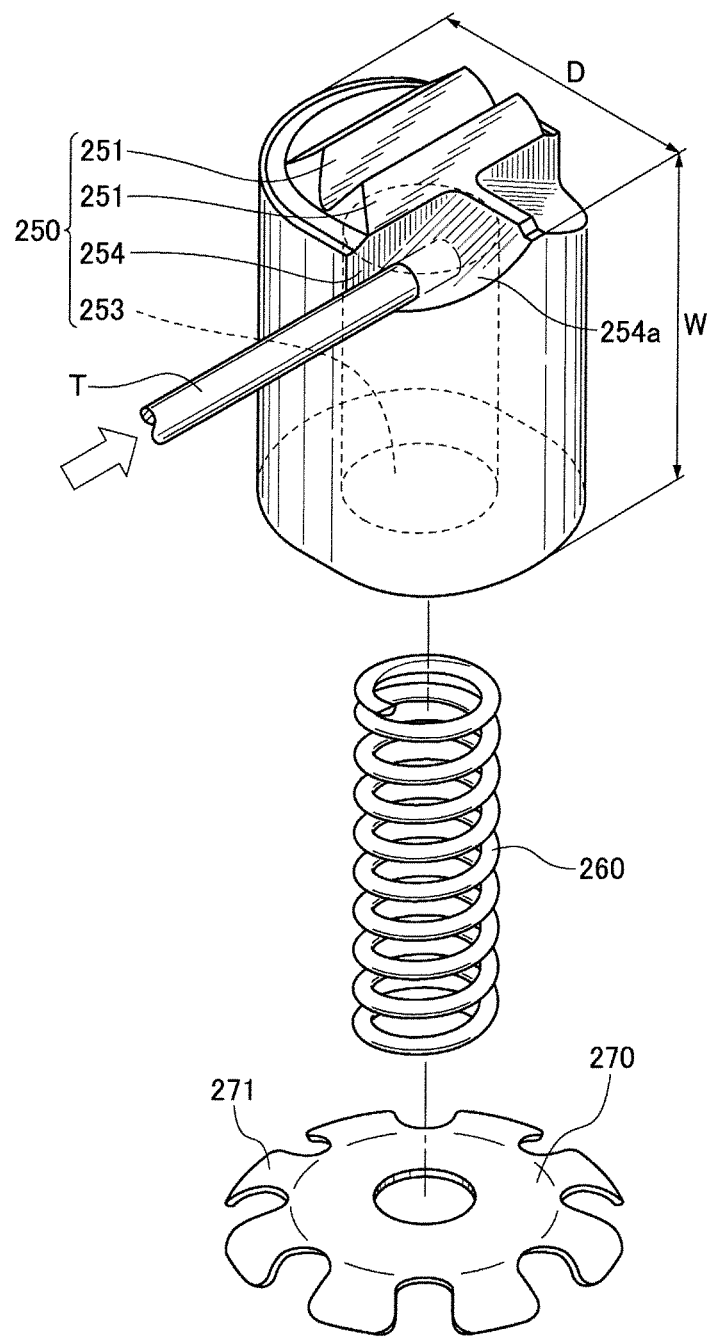
FIG. 14 is an exploded view of a piston, a piston biasing spring and a spring stopping plug.

In a modified embodiment, as shown in FIG. 14, the plunger is provided with two ratchet teeth 251 to engage with the rack teeth 222 (FIG. 15) engraved on the side surface of the plunger 220, to disperse the engagement load evenly. The two ratchet teeth 251 are disposed at intervals equal to the distance between the rack teeth 222. In addition, the pitch and tooth height of the rack teeth 222 are equal to the pitch and height of the ratchet teeth 251. The plunger may be provided with any number of teeth, preferably in the range from two to ten teeth.

The term "plunger-side" refers to a position closer to the plunger 120 in the sliding direction, and the term "non-plunger-side" refers to positions farther from the plunger 120 in the sliding direction, i.e., the side opposite from the plunger-side.

As shown in FIG. 5, the plunger-biasing spring 160 is inserted into a spring-accommodating hole 153 which is a hollow space inside the plunger 150, the axis of which extends along the direction in which the piston slides.

The spring 160 is held in place by a spring retaining plug 170, which is in the form of a washer having a plural resilient tongues 171 projecting from its periphery. The tongues 171 fit into the non-plunger-side end of the ratchet receiving hole 113 and allow the washer to be rigidly and readily assembled without falling out of the piston-receiving hole. The plug reduces flapping noise by stably securing the ratchet mechanism while the engine is operating, and prevents seizing of the plunger. The biasing force Fs exerted by the spring 160 (FIGS. 6-10) depends on the position of the spring retaining plug 170.

As shown in FIG. 3, in the tensioner 100, the rack teeth 122 are concave/convex in form, having stop surfaces 122$a$, which are inclined toward the advance direction when proceeding in the disengagement direction of the piston 150, and sliding surfaces 122$b$, which are inclined toward the setback direction, proceeding in the disengagement direction of the piston 150.

The ratchet teeth 151 are similarly concave/convex in form, having stop counterface surfaces 151$a$, which are inclined toward the advance direction when proceeding in the direction of disengagement of the piston 150, and sliding counterface surfaces 151$b$, which are inclined toward the setback direction when proceeding in the direction of disengagement the piston 150.

The inclination angle $\theta$ of stop surface 122$a$ formed on the plunger 120 is smaller than the inclination angle $\alpha$ of the sliding surface 122$b$. For instance, the inclination angle $\theta$ is preferably 30° or less, and the inclination angle $\alpha$ is preferably greater than the inclination angle $\theta$, but less than 90°. The inclination angles $\theta$ and $\alpha$ are angles measured from a line extending parallel to the sliding direction and lines tangent to the tooth surfaces, all said lines being in a common plane to which the advance/setback direction of the plunger and the sliding direction of the piston are mutually parallel.

The inclination angle $\theta$ is determined by experiment and simulation so that disengagement of the rack teeth 122 and the ratchet teeth 151, and setback of the plunger 120, are blocked when the first reaction force F1 acts on the plunger 120, but so that disengagement of the rack teeth 122 and the ratchet teeth 151, and setback of the plunger 120, are allowed when the second reaction force F2 acts on the plunger 120. In contrast to a conventional rack, in which the stop surfaces are not inclined, the rack teeth of the plunger in the invention can have a range of inclination angles θ.

The inclination angle α is similarly determined by experiment and simulation so that disengagement of the rack teeth 122 and the ratchet teeth 151, and advancing movement of the plunger 120 can take place when an advancing force F1 (FIG. 6) acts on the plunger 120.

In all examples, a first reaction force F1 is a reaction force that is exerted on the plunger when the timing chain tension is smaller than an excessive tension, and the second reaction force F2 is a force having a magnitude greater than the first reaction force F1.

Figure 6:
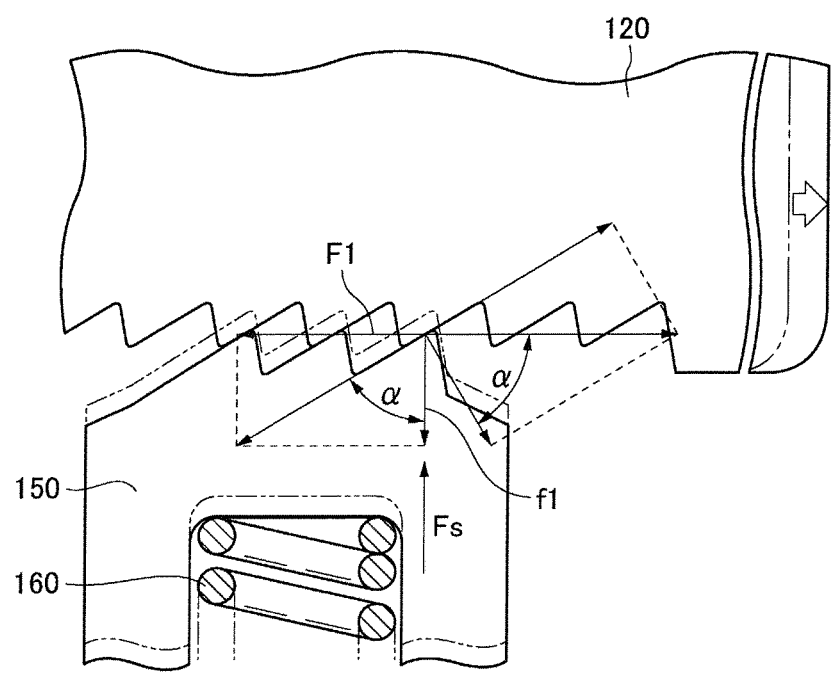
FIG. 6 is a schematic diagram showing the engagement of rack teeth on the plunger with ratchet teeth as the plunger is advancing in starting an engine.

As shown in FIG. 6, during starting and normal operation of the engine when the tension in the timing chain is not excessive, the plunger 120 is moved in the advancing direction by an advancing force F1 due to the plunger-biasing spring 130 and the pressure of the oil within the high-pressure oil chamber R. The biasing force Fs exerted by the plunger-biasing spring 160 is set so that it is smaller than the force component f1 acting on the piston 150 in the disengagement direction. Component f1 is the component of the advancing force F1 acting in the disengagement direction as a result of the action of the rack teeth 122 on the ratchet teeth 151.

When the component force f1 surpasses the resultant of the biasing force Fs and the sliding direction component of the frictional force acting between the rack teeth 122 and the ratchet teeth 151, the plunger 120 advances, following the lever L (FIG. 1) while pushing the plunger 150 in the disengagement direction. FIG. 6 shows, in two-dot broken lines, the positions of the front end of the plunger 120 and the piston 150 before the plunger 120 advances.

When the plunger 120 advances to apply tension to the timing chain C during operation of the engine as shown in FIG. 6, the relationship of the magnitudes of the component force f1 in the sliding direction generated by the advancing force F1 acting on the plunger 120, and the biasing force Fs of the piston 150 is:

$$f1 = F1 \times \sin\alpha \times \cos\alpha f1 > Fs$$

As shown in FIG. 6, broken lines at the protruding side of the plunger indicate the starting position of the plunger before the plunger protrudes in the advancing direction, upon starting of the engine.

Figure 7:
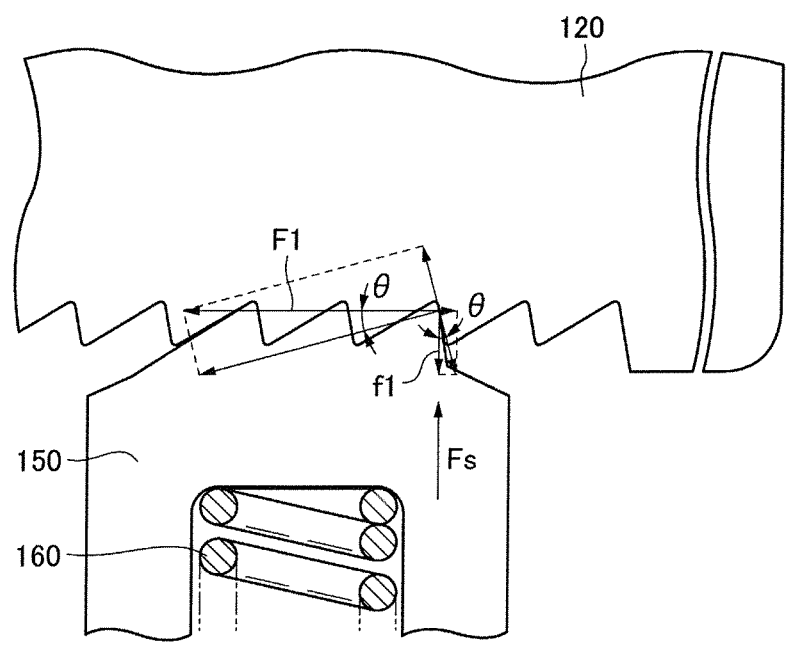
FIG. 7 is a schematic diagram showing the engagement of rack teeth on the plunger with ratchet teeth as the plunger is blocked from setting back in starting the engine.

Referring to FIG. 7, F1 is the first reaction force exerted by the timing chain through the lever in the setback direction upon starting the engine when the hydraulic pressure in the high-pressure oil chamber 131 is low, or while the engine is operating normally without excessive tension in the timing chain. The corresponding first force component f1 acts in the disengagement direction on the piston by the action of the rack teeth 122 on the ratchet teeth 151. The ratchet biasing force Fs is set so that it is greater than the magnitude of component f1. Consequently, the engagement of the ratchet teeth 151 with the rack teeth 122 restricts movement of the plunger 120 and blocks setback displacement of the plunger 120 limiting the setback displacement of the plunger to its backlash.

When setback of the plunger 120 is blocked on starting the engine, for example as shown in FIG. 7, the relationship of the magnitudes of the first component force f1 in the sliding direction generated by the first reaction force F1 exerted on the plunger 120 by the timing chain on starting the engine, and the biasing force Fs of the piston 150, is:

$$f1 = F1 \times \cos\theta \times \sin\theta \times \mu f1 < Fs;$$

where μ is the coefficient of friction between the rack teeth 122 and the ratchet teeth 151.

Figure 8:
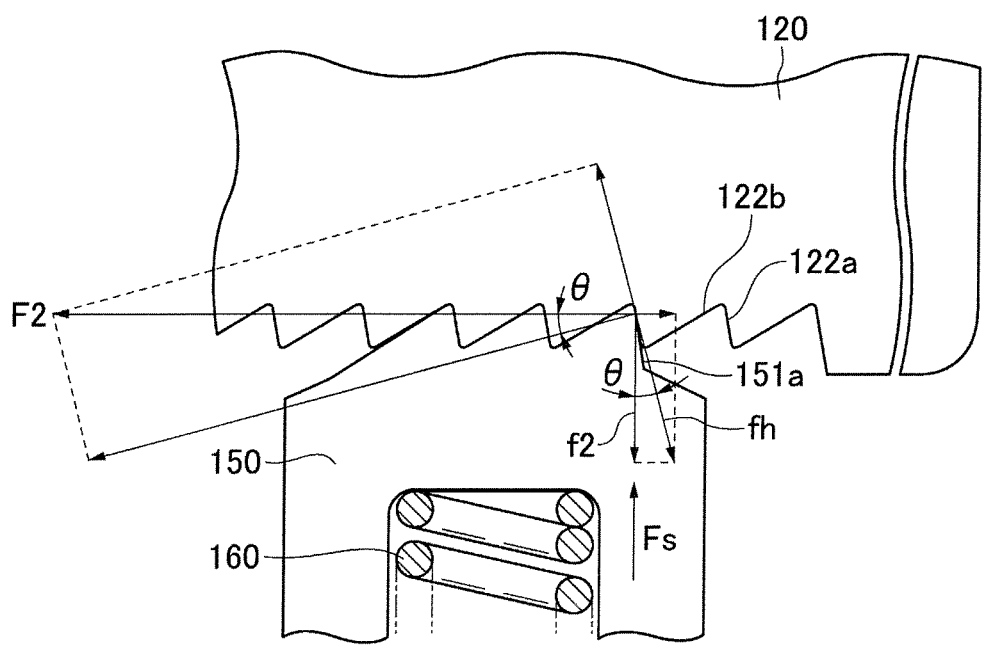
FIG. 8 is a schematic diagram showing the engagement of rack teeth on the plunger with ratchet teeth as the plunger begins to set back when the tension of the timing chain becomes excessive.

When the magnitude of the reaction force is at a high level, the reaction force is a second reaction force F2, as shown in FIG. 8, and a second component force f2 acts on the piston 150 in the disengagement direction, through engagement of the rack teeth with the ratchet teeth. The biasing force Fs is set so that it is smaller than the second component force f2.

The reaction force can reach the magnitude F2 when excessive tension is generated in the timing chain C. This excessive tension can occur, for example, after the plunger 120 has advanced excessively due to elongation of the timing chain, or as a result of other causes such as fluctuations in the tension of the timing chain C due to thermal expansion of the engine, the timing chain C, or both, due to temperature changes in the engine.

Figure 9:
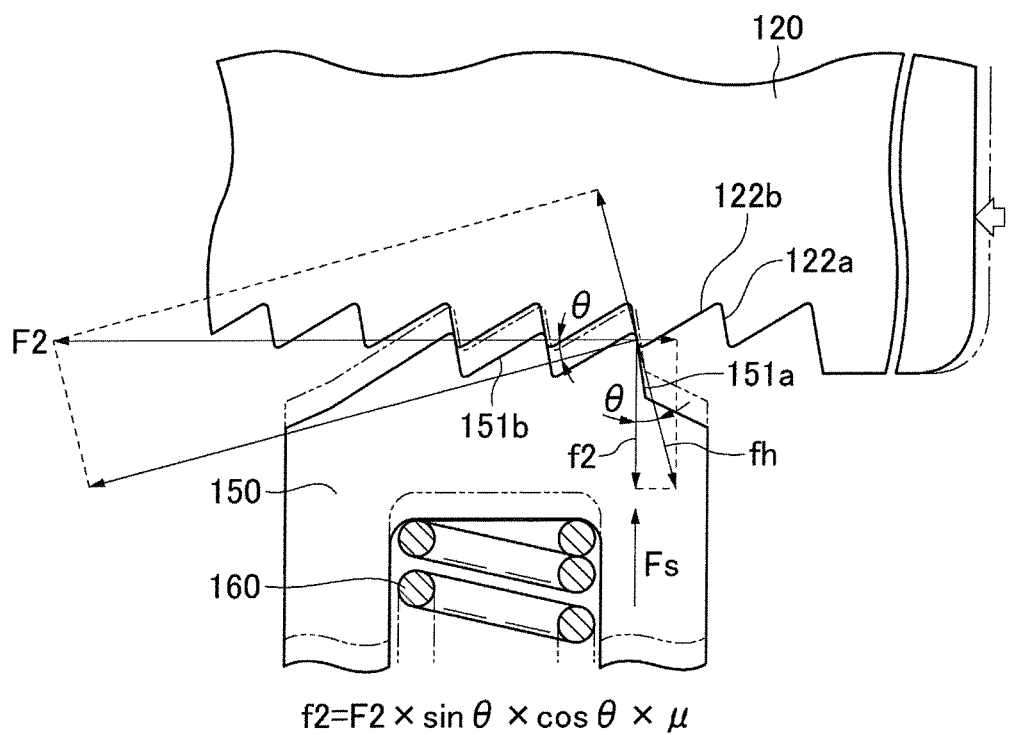
FIG. 9 is a schematic diagram showing the disengagement of rack teeth and ratchet teeth as the plunger sets back when the tension of the chain is excessive.

When the plunger 120 advances excessively due to a temperature change in the engine, as shown in FIGS. 8 and 9, the timing chain can be under excessive tension, and setback of the plunger 120 is allowed. Here, the relationship of magnitudes of the second component force f2 generated by the second reaction force F2 exerted on the plunger 120 by the timing chain, and the biasing force Fs, is:

$$f2 = F2 \times \cos\theta \times \sin\theta \times \mu f2 > Fs;$$

where μ is the coefficient of friction between the rack teeth 122 and the ratchet teeth 151.

Figure 10:
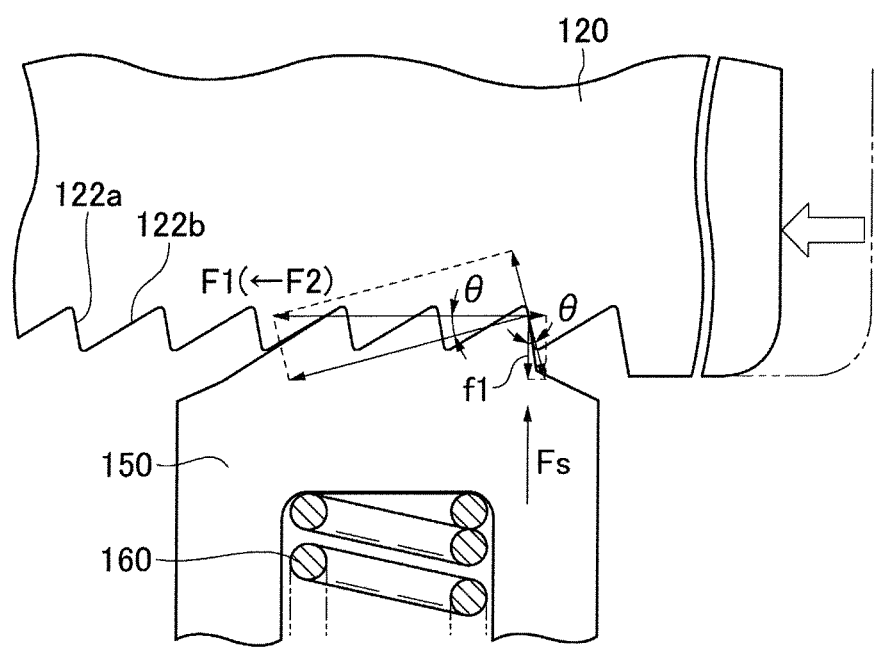
FIG. 10 is a schematic diagram showing the engagement of rack teeth with ratchet teeth after the ratchet teeth disengage the rack teeth with which they were previously engaged, as the plunger sets back when the tension in the chain is excessive.

As shown in FIG. 8, when the reaction force F2 is exerted on the plunger when the tension in the timing chain C becomes excessive after the engine is started, the component force fh is exerted by the stop surface 122a on the stop counterface surface 151a. The second component force f2 becomes greater than the resultant of the biasing force Fs and the frictional force. As shown in FIG. 9, the piston 150 slides in the disengagement direction, and the ratchet teeth 151 disengage the rack teeth 122. Then, the plunger 120 sets back by a distance corresponding to one tooth or several teeth of the rack teeth 122 until the reaction force F returns to the first reaction force F1, and the first component force f1 acts on the piston 150 as shown in FIG. 10. Thus, when the tension of the timing chain C becomes excessive, the tensioner 100 does not restrict movement of the plunger 120 in the setback direction, and allows setback displacement beyond the setback permitted by backlash.

The biasing force exerted by the plunger-biasing spring 130 in the advancing direction (FIG. 2A) can be greater than the biasing force Fs exerted by the piston-biasing spring 160. By adjusting the biasing force Fs within the range described above. It is possible to adjust the condition under which disengagement of the ratchet teeth from the rack teeth is caused by excessive tension in the chain after starting of the engine.

When the second reaction force F2 is exerted on the plunger by the timing chain when the tension in the timing chain C is excessive, this second reaction force acts on the stop counterface surfaces 151a through the stop surfaces 122a to produce a second component force f2 in the disengagement direction along the direction of sliding movement of the piston. The second component force overcomes the ratchet-biasing force and friction, and causes the ratchet teeth 151 to disengage the rack teeth 122. Then, as shown in FIGS. 9 and 10, the rack teeth return by a distance corresponding to one or more teeth, sliding on slide counterface surfaces, and engaging stop counterface surfaces.

As shown in FIGS. 8-10, broken lines at the protruding side of the plunger indicate the starting position of the plunger when the tension of the chain becomes excessive (FIG. 8), and as the plunger sets back (FIGS. 9 and 10).

Figure 11A:
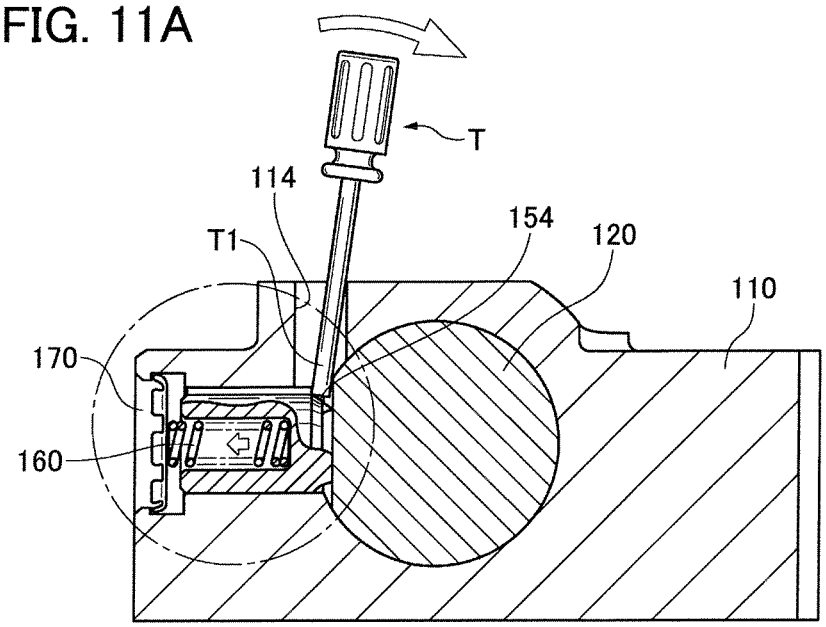
FIG. 11A is a longitudinal cross section of a plunger of the invention including the ratchet releasing mechanism showing a releasing of the ratchet.
Figure 11B:
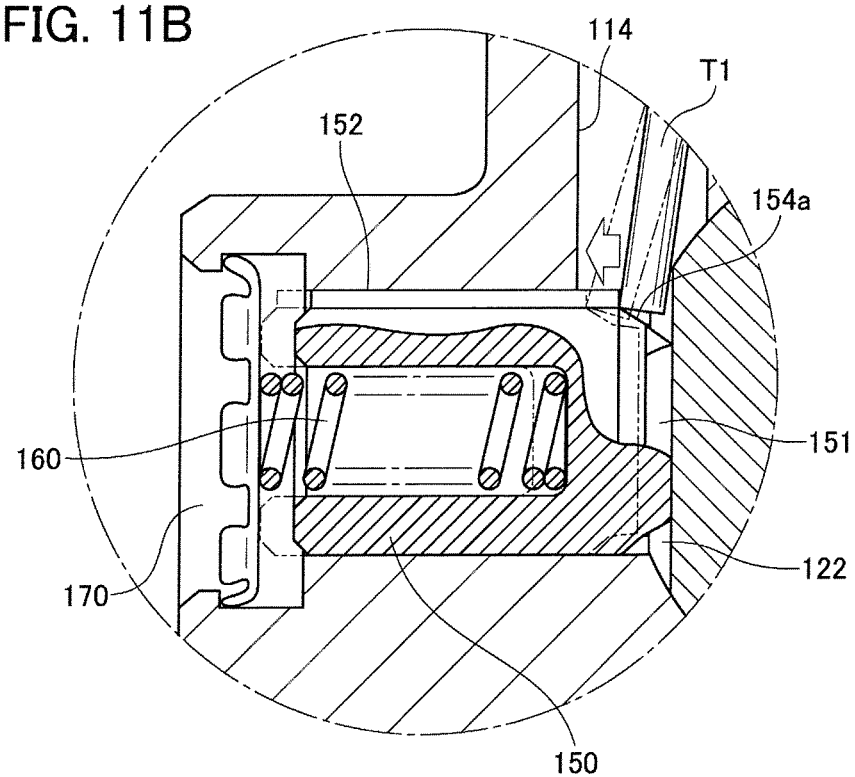
FIG. 11B is an enlarged view of a part of the plunger surrounded by a broken line in FIG. 11A.
Figure 12A:
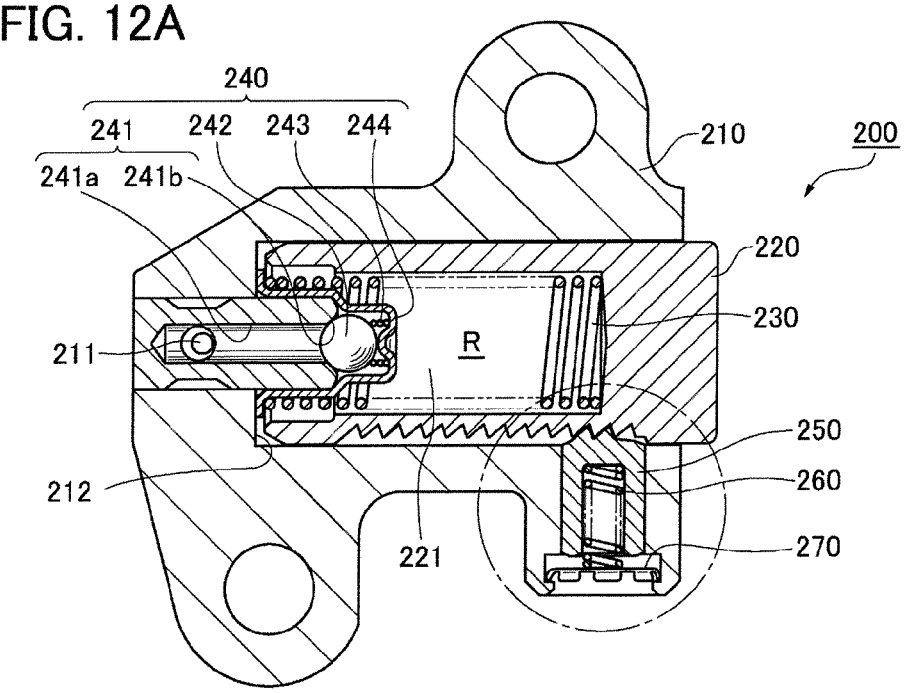
FIG. 12A is a longitudinal cross-section of a ratchet-type tensioner according to the invention.
Figure 12B:
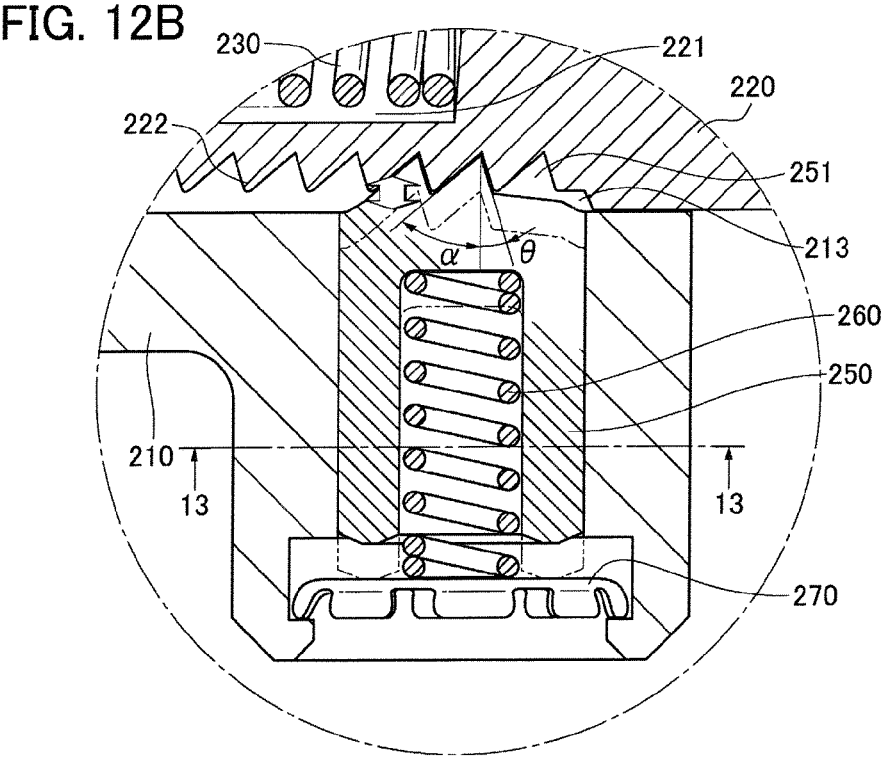
FIG. 12B is an enlarged view of a part of the ratchet-type tensioner surrounded by a broken line in FIG. 12A.

The ratchet releasing mechanism allows for release of engagement of the ratchet teeth 151 and the rack teeth 122 by a tool T, as shown in FIG. 11. The ratchet releasing mechanism includes a tool engaging portion 154 provided at the front end of the piston 150 to abut and engage with the end T1 of a tool T. The tool T is inserted through a tool inserting hole 114 provided in the housing 110 toward the tool engaging portion 154.

In one embodiment, the tool engaging portion 154 comprises a stepped abutment surface 154a formed between the ratchet teeth 151 and the ratchet-side convex strip 152 which is a part of the outer circumferential surface of the piston at the front end of the piston 150. The pin inserting hole 114 is arranged that that a tool T inserted through the pin inserting hole 114 can engage the tool engaging portion 154 and push back the piston 150 in a direction away from the plunger by a prying action exerted against the stepped abutment surface 154a by the tool T. Thus, it becomes possible to push and set back the plunger 120 and easily release the engagement of the ratchet teeth 151 to the rack teeth 122, to considerably reduce the burden of maintenance on the tensioner.

Figure 15A:
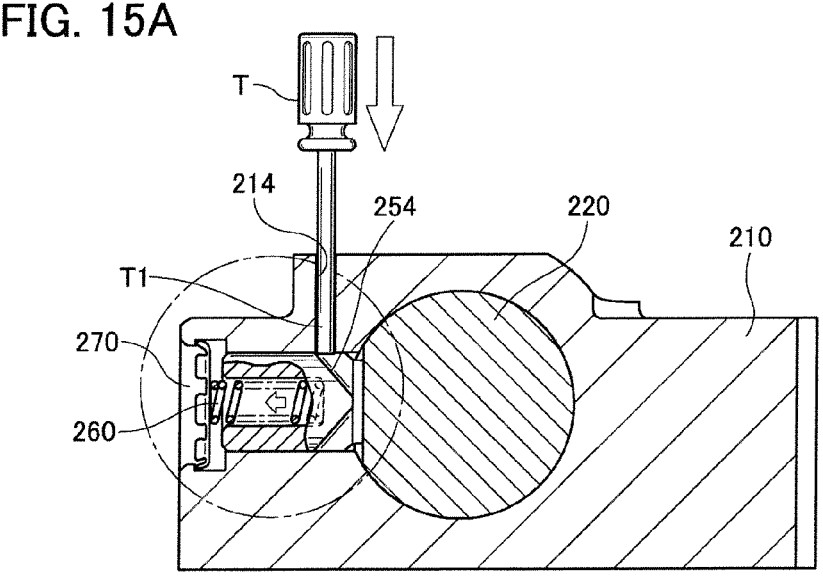
FIG. 15A is a longitudinal cross section of a plunger of the invention including the ratchet releasing mechanism showing a releasing of the ratchet.
Figure 15B:
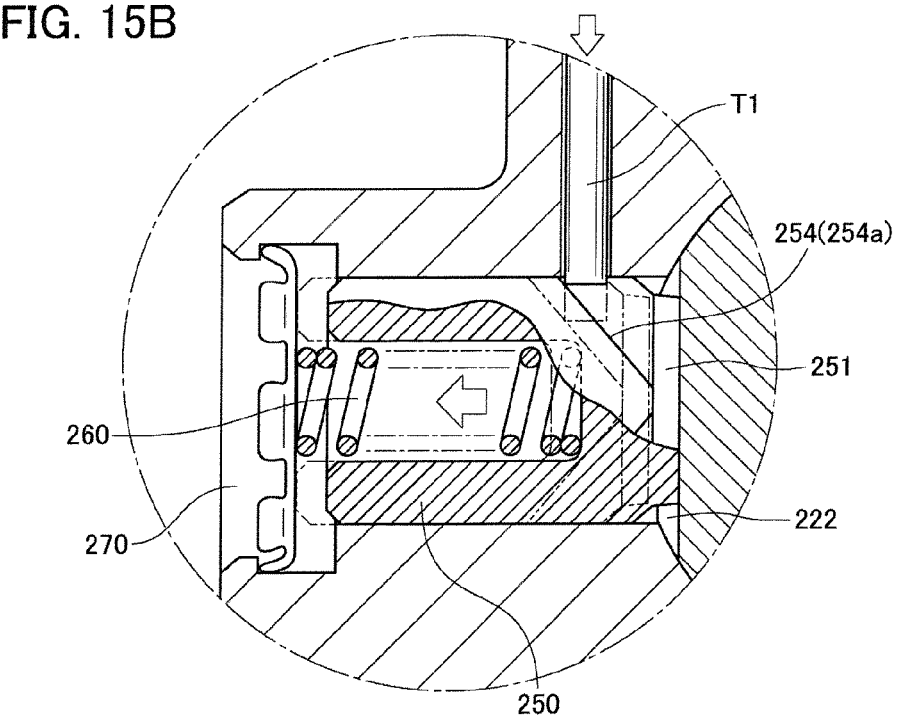
FIG. 15B is an enlarged view of a part of the plunger surrounded by a broken line in FIG. 15A.
Figure 16:
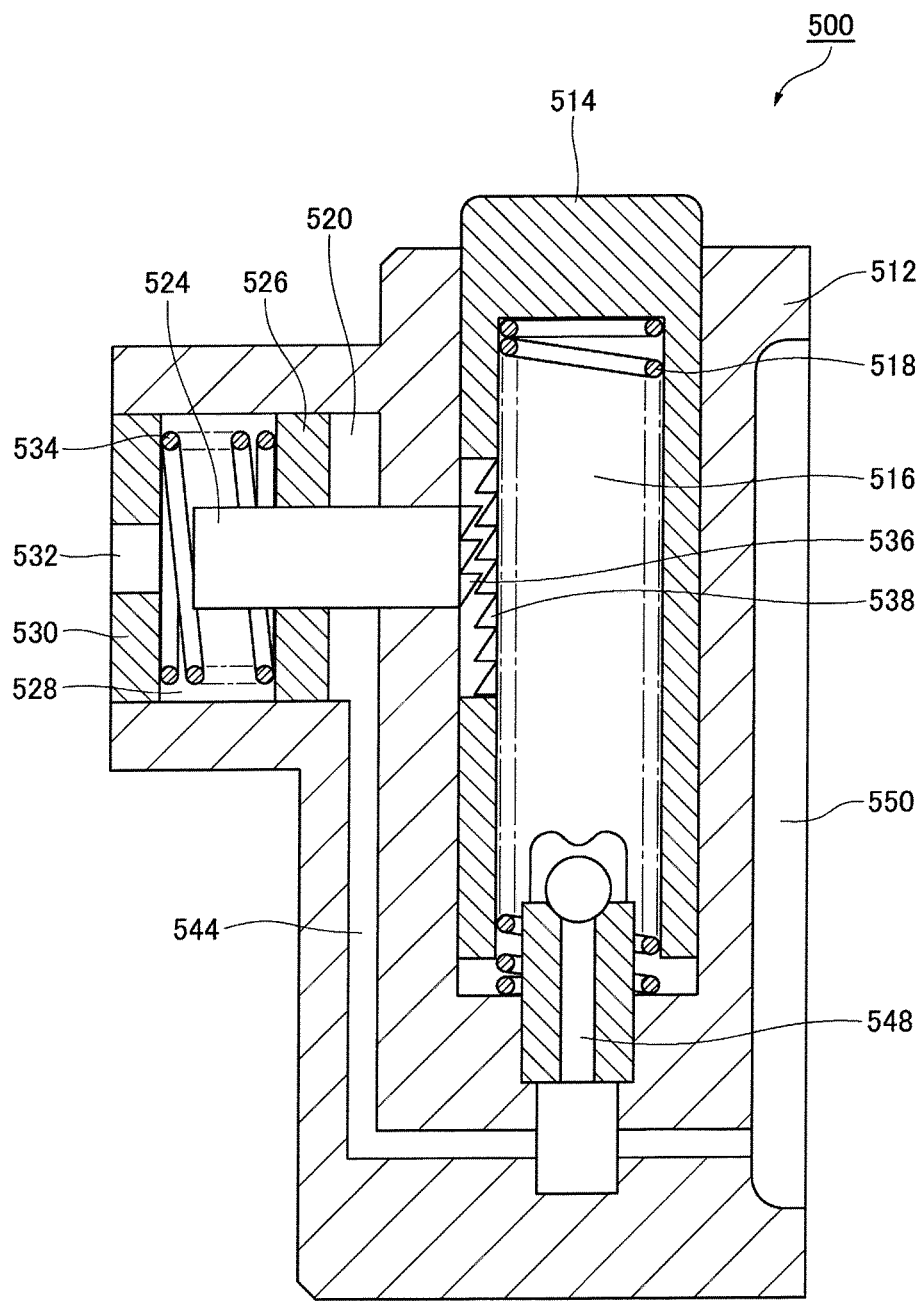
FIG. 16 is a cross-section view of a prior art ratchet-type tensioner.

In another embodiment, as shown in FIGS. 14 and 15, the ratchet releasing mechanism comprises a tool engaging portion 254 which comprises a tapered abutment surface 254a formed on the piston by partly cutting away the front end of the piston 250 toward the rear-end at an oblique angle relative to a plane to which the axis of the piston is perpendicular. The tapered abutment surface 254a is formed such that when the tool T is inserted into the tool inserting hole 214, the tool T pushes the piston 250 away from the plunger 220 by a camming action exerted against the tapered abutment surface 254a by the tool T. Thus, it becomes possible to push and set back the plunger 220 and easily release the engagement of the ratchet teeth 251 to the rack teeth 222, to considerably reduce the burden of maintenance on the tensioner.

What is claimed is:

1. A ratchet-type tensioner, comprising:
   a housing;
   a plunger supported by the housing for movement in opposite advancing and setback directions in a plunger-receiving hole, the plunger having rack teeth provided thereon, and being arranged to advance with respect to the housing along the advancing direction for applying tension to a traveling transmission medium engaged with rotating members;
   a high pressure oil chamber formed by the plunger and tensioner housing;
   a ratchet mechanism capable of restricting the plunger from setting back due to a reaction force acting in a setback direction from the transmission medium;
   said ratchet mechanism comprising:
   a piston-receiving hole provided within the housing having a front end adjacent the plunger-receiving hole and a rear end remote from the plunger-receiving hole and having an outer circumferential surface;
   a piston slidable in the piston-receiving hole and movable in a sliding direction transverse to the advancing and setback directions;
   ratchet teeth on the piston engageable with the rack teeth of the plunger;
   a piston-biasing spring for biasing the piston in an engaging direction along the sliding direction so that the ratchet teeth engage with the rack teeth;
   a plug fitted in the rear end of the piston-receiving hole, the piston-biasing spring bearing against the plug; and
   a ratchet releasing mechanism for releasing engagement of the ratchet teeth with the rack teeth;
   said ratchet releasing mechanism comprising a tool engaging portion provided at the front end of the piston to abut and engage an end of a tool, and a tool inserting hole provided in the housing, through which the tool can be inserted and engaged with the tool engaging portion, thereby pushing the piston away from the plunger so that the ratchet teeth disengage the rack teeth.

2. The ratchet-type tensioner according to claim 1, wherein the tool engaging portion of the piston comprises a stepped abutment surface formed between the ratchet teeth and the outer circumferential surface of the piston at the front end of the piston, and the tool inserting hole is positioned to allow the piston to be pushed away from the plunger by a prying action exerted against the stepped abutment surface by the tool.

3. The ratchet-type tensioner according to claim 1, wherein the tool engaging portion of the piston comprises a tapered abutment surface formed on the piston adjacent the ratchet teeth on the piston; and the pin inserting hole is positioned to allow the piston to be pushed away from the plunger by a camming action exerted against the tapered abutment surface by the tool.

4. The ratchet-type tensioner according to claim 1, wherein the ratchet mechanism restricts the plunger from setting back by engaging the ratchet teeth with the rack teeth when the reaction force is a first reaction force generated when the tension in the traveling transmission medium is less than a predetermined excessive tension, but allows the plunger to set back by sliding of the piston in a disengaging direction to disengage the ratchet teeth from the rack teeth when the reaction force is a second reaction force generated when the tension in the traveling transmission medium at least as great as said predetermined excessive tension, the ratchet biasing force being greater than a first component force in the sliding direction, generated from said first reaction force, but smaller than a second component force in the sliding direction, generated from said second reaction force.

5. The ratchet-type tensioner according to claim 1,
   wherein said rack teeth are concave and convex teeth formed by stop surfaces facing in the setback direction and sliding surfaces facing in the advance direction, said sliding surfaces being inclined relative to the sliding direction and facing in a disengaging direction opposite from the engaging direction; and
   wherein the ratchet teeth of the piston are concave and convex teeth formed by stop counterface surfaces inclined toward the advance direction when proceeding in the disengaging direction, and sliding counterface surfaces inclined toward the setback direction when proceeding in the disengaging direction.

6. The ratchet-type tensioner according to claim 5, wherein the inclination angle of said stop surface is less than the inclination angle of said sliding surfaces.

7. The ratchet-type tensioner according to claim 1, wherein the ratchet mechanism comprises a means for preventing rotation of the piston in the circumferential direction of the piston receiving hole when the ratchet teeth and rack teeth are engaged.

8. The ratchet-type tensioner according to claim 7, wherein the means for preventing movement is provided by a convex strip on the outer circumferential surface of the piston and a concave groove in the piston-receiving hole in the housing, said groove extending along the sliding direction of the piston and receiving the convex strip.

9. The ratchet-type tensioner according to claim 7, wherein the length of the piston is greater than the outer diameter thereof.

10. The ratchet-type tensioner according to claim 7, wherein the piston-biasing spring is inserted within a spring-accommodating hole formed in the piston along the sliding direction.

* * * * *